March 28, 1944. H. R. BRESLAU 2,345,092
AUTOMATIC LEVEL CONTROLLING MECHANISM
Filed Oct. 29, 1940 3 Sheets-Sheet 1

Inventor
Harold R. Breslau
By Dodge & Ostler
Attorneys

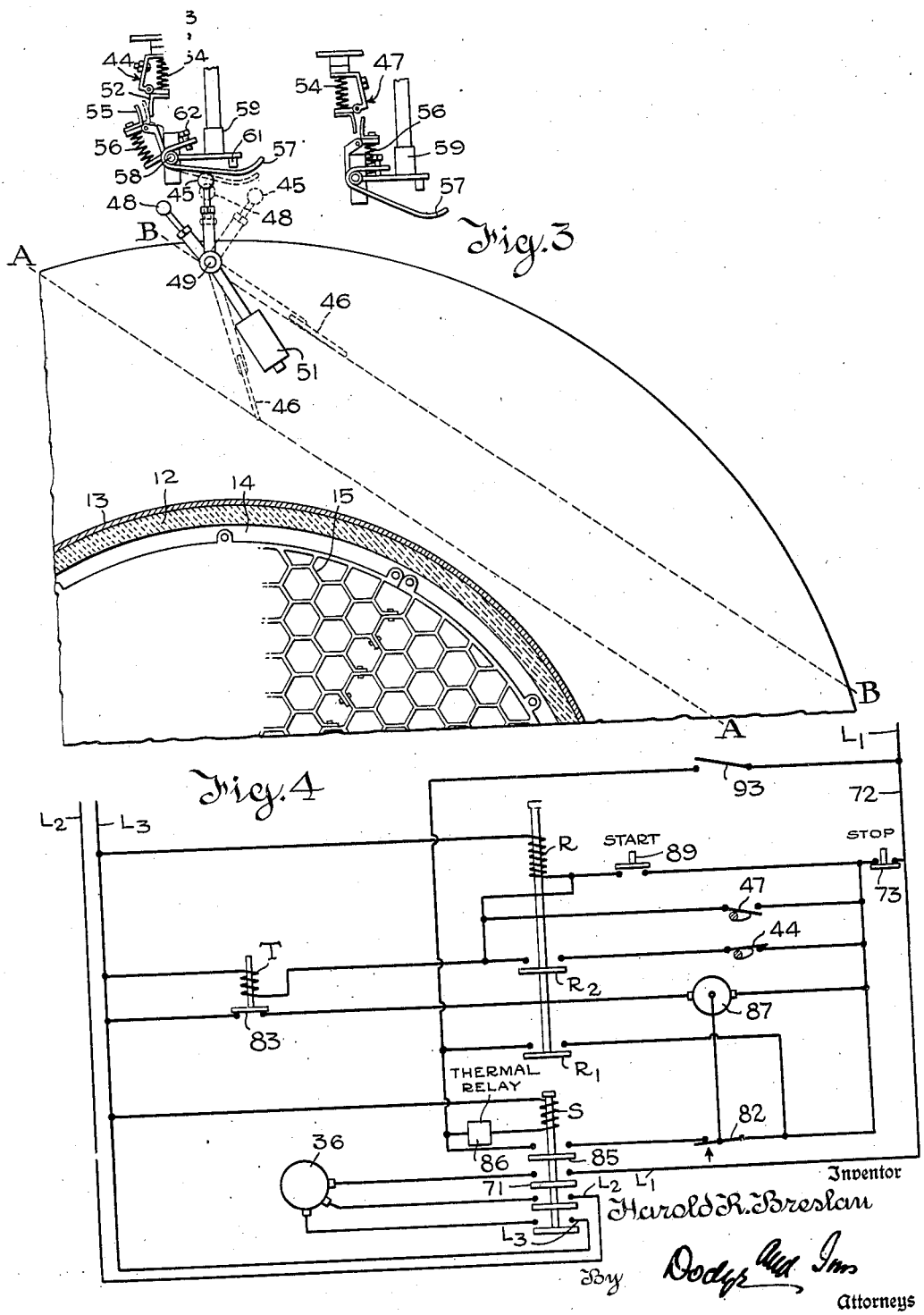
March 28, 1944.  H. R. BRESLAU  2,345,092
AUTOMATIC LEVEL CONTROLLING MECHANISM
Filed Oct. 29, 1940   3 Sheets-Sheet 2
Inventor
Harold R. Breslau
By Dodge
Attorneys

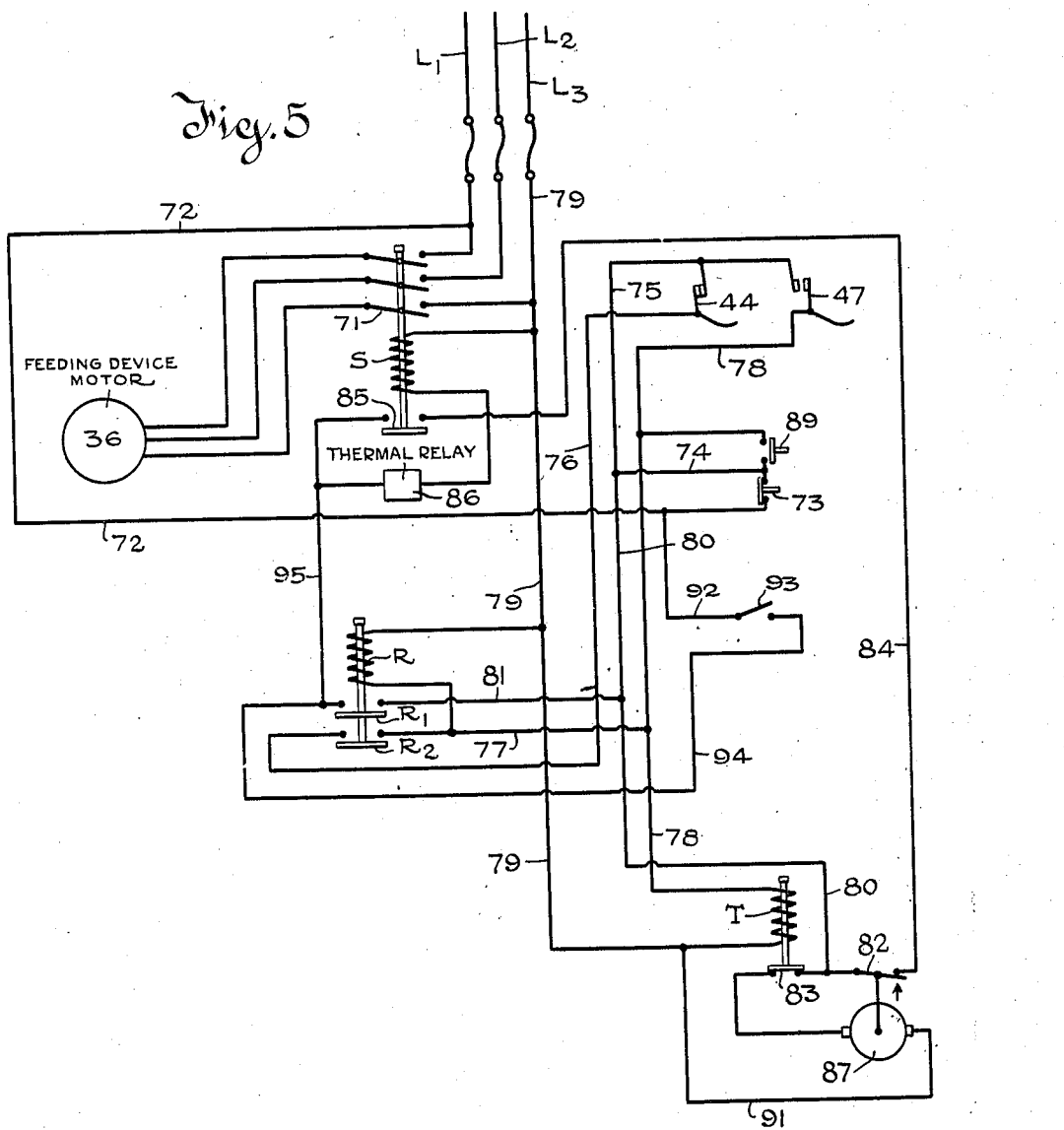

Patented Mar. 28, 1944

2,345,092

UNITED STATES PATENT OFFICE 2,345,092

AUTOMATIC LEVEL CONTROLLING MECHANISM

Harold R. Breslau, Martinsburg, W. Va., assignor to The Standard Lime and Stone Company, Baltimore, Md., a corporation of Maryland Application October 29, 1940, Serial No. 363,340

10 Claims. (Cl. 263—32)

This invention relates to automatic level controlling mechanism for rotary drums wherein material to be treated is maintained at a predetermined level. One application of the invention is that of controlling the feed of material to rotary kilns, and especially kilns equipped with a feed and preheating chamber of the type disclosed in the patent to Mueller 2,204,145 dated June 11, 1940, and also in Mueller Patent 2,249,087, July 15, 1941.

In the prior art of feeding rotary drums, maintenance of proper level has been dependent upon the constant attention of an operator. With the structure available, this method is inefficient and unsatisfactory because of variations in judgment or inattention, and the feeding is not carried out with uniform or maximum efficiency.

Although this invention is of general application as indicated above, it has been illustrated as applied to rotary kilns of the Mueller type in which the feed and offtake end of a rotary kiln is equipped with a feed chamber for delivering material to the kiln. The hot waste gases escaping to the offtake pass through the material in the feed chamber, raise its temperature by heat exchange and utilize heat otherwise lost, thus reducing the fuel requirement for the burning operation in the kiln. Such an arrangement is dependent upon the maintenance in the feed chamber of a level of material which prevents the escaping gases from by-passing it, that is, the chamber must be kept filled to a predetermined level at all times for efficient and satisfactory operation. Hence, a device of this character is described by way of example since it presents requirements which the invention is well adapted to meet.

Automatic kiln feeders in which gate means actuated during the rotation of the kiln supplies charges of material to the kiln are known. However, they are incapable of varying the rate of feed to meet changing conditions, and hence require the constant attention of an operator as well as frequent manual readjustment of the feeding mechanism.

The present invention has for its object to secure and maintain accurately a predetermined rate of feed of material to the inlet of a drum or kiln, and particularly to maintain a predetermined level of material in the drum or the kiln feed chamber. The arrangement is so contrived that so long as the reservoir or storage bin for material to be fed contains an adequate supply, the mechanism can be relied upon to maintain a predetermined level of material at all times, regardless of variations in the rate of treatment or in the characteristics of the material under treatment.

In the accompanying drawings the invention has been illustrated as applied to a kiln of the type shown in the above mentioned patents wherein a drum-like feed and preheating chamber is used. It is to be understood, however, that the invention is not limited to the feeding of devices of that particular type, but may be applied to any rotary drum wherein a predetermined level of material is to be maintained to replace material which is being discharged.

In the drawings:

Fig. 3 is an enlarged partial section of the kiln showing the feed controlling switches and the kiln-carried means for operating them;

Fig. 4 is an across-the-line diagram showing the operating circuits of the automatic feed controlling means; and Fig. 5 is a complete wiring diagram of the entire electric system for accomplishing automatic control.

Figure 1:
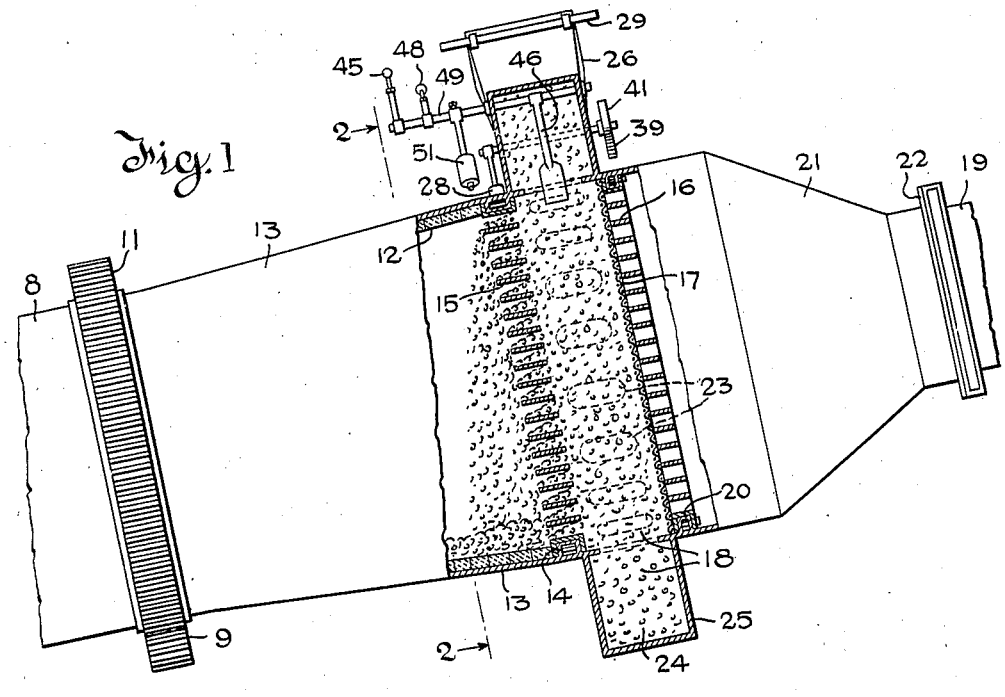
Figure 1 is a view partly in elevation and partly in axial section of a rotary kiln equipped with automatic feeding mechanism embodying the present invention.

Referring first to Fig. 1, 8 represents the inlet end of a cylindrical rotary kiln which may be mounted in the usual manner and is adapted to be driven through a pinion 9 and a ring gear 11. The kiln comprises a cylindrical shell having a refractory lining as indicated at 12, and a conical portion 13 carrying a flange 14 adapted to support a feeding grid 15 of the type described in the second Mueller patent above identified. The portion 13 also carries a second or supporting grid 16 associated with a screen 17, the screen 17 and grid 16 being carried by a mounting flange 20 in the shell and spaced from the grid 15 to retain a body of material such as limestone to be burned. The kiln illustrated is of known form and may extend to the left to a considerable distance, such kilns commonly being between 150 and 400 feet in length. The firing end of the kiln is remote from the inlet, and the hot gases flowing through the firing zone pass through the grid 15, the body of stone, and then through the screen 17 and grid 16 to the offtake 19, the offtake being connected to the reduced conical portion 21 of the kiln by a packed joint 22.

As pointed out above, for efficient operation of a kiln of the type shown, and to prevent waste gases flowing to the offtake from by-passing the entering body of stone, it is essential that the space between grids 15 and 16 be kept substantially full. Consequently, the shell of the kiln is perforated as indicated at 23 to form communication between this space and an extension 24 formed within the annular shell 25, the two together forming the feed chamber of the kiln, and designated 18. The purpose of the present invention is to supply material to the feed chamber at desired intervals in order to assure maintenance of a predetermined level of material in said chamber.

It is known in the art to feed material to a kiln by the use of feed hoppers and trap gates of the type disclosed in Mueller Patent No. 2,204,145. With such an arrangement, however, it is essential that manual control of the feed be exercised to assure that the chute which feeds material to the feed hoppers shall be kept full of material. It is the purpose of the present invention to avoid such manual supervision and control, and to make it possible to feed automatically a supply of material to a feeding reservoir from which it is delivered at periodic intervals to the feed hoppers carried by the kiln.

Figure 2:
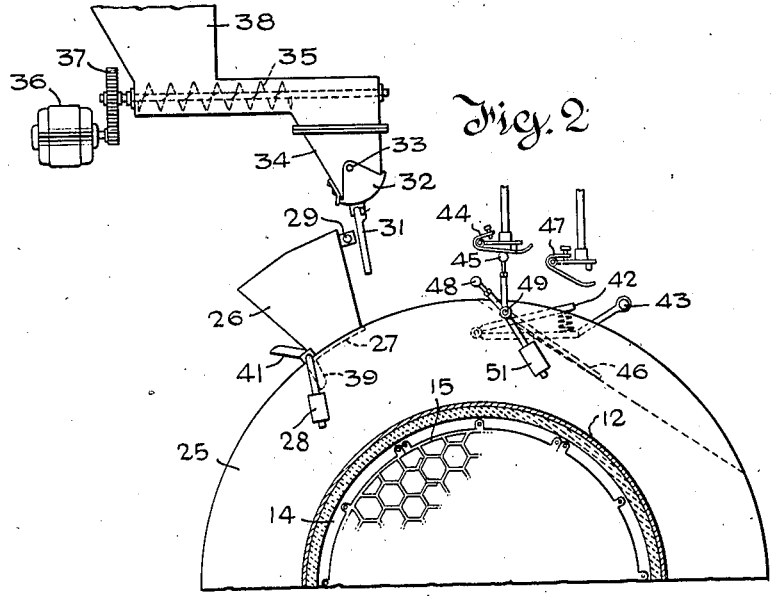
Fig. 2 is a partial transverse section of the inlet end of the kiln substantially on the line 2—2 of Fig. 1, showing the feeding means and a portion of the automatic control for the same.

In practice the shell 25 may carry any desired number of feed hoppers 26, only one of which is shown in Fig. 2. The number will usually be two or four, depending upon the particular arrangement. Each hopper 26 carries a pivoted trap gate 27 which is biased to closed position by an adjustable counterweight 28. The hopper, together with its gate structure, is rotatable with the shell 25 and is so arranged that during its travel from left to right a striker bar 29 on the hopper engages an arm 31 carried by a swinging gate 32 hinged at 33 to the body of a reservoir 34. Material is supplied to the reservoir 34 by means such as an endless screw 35 driven by a feed motor 36 and gearing 37.

The chute 38 may communicate with any suitable source of material to be treated in the kiln. With this arrangement, operation of the motor 36 causes material to be supplied to the reservoir 34. As the hopper 26 moves to the right from the position shown in Fig. 2, the gate 32 is opened, permitting material to discharge from the reservoir 34 into the hopper 26 and fill it. As the kiln continues to rotate, the gate 32 is closed to stop the supply of material to the hopper at the proper time, and to prevent material from falling outside of the hopper. After approximately 60° of rotation from its position under the reservoir 34, the hopper 26 discharges its load into the feed chamber upon opening of gate 27.

Gate 27 carries an opening lever 39 and a closing lever 41. A spring-mounted cam 42 is arranged to cooperate with the opening lever 39 so as to open the gate 27 and discharge material into the chamber at the proper time, after which the weight recloses the gate. Should the weight fail to close the gate, positive closing occurs by lever 41 striking fixed stop 43. The mechanism so far described is that set forth in the Mueller Patent No. 2,249,087, and is dependent for its operation upon maintenance of an adequate supply of material in the reservoir 34. The present invention is concerned with automatic control of the supply of material to this reservoir to keep the feed chamber of the kiln filled to levels between predetermined high and low limits, and thus assure uniform efficiency of operation. The arrangement is such that the feed motor will operate only when it is needed and will pass through a minimum number of starting and stopping cycles, thus minimizing wear, maintenance, and use of power.

The invention is predicated on the theory that with the feed motor supplying material to the reservoir 34 conservatively, the motor shall operate to supply material whenever the level of material in the feed chamber is below a set value indicated approximately by line B—B in Fig. 3, and shall not operate when the level of material is above that set value. The feed chamber or drum in which the level is to be maintained, therefore, is provided with one or more level indicating or sensing devices designed during rotation of the kiln to actuate successively, control switches for the feed motor.

A control switch designated 44, which has for convenience been designated the full switch because it stops the feed motor when the feed chamber is full, is normally closed to complete the circuit for the feed motor, but is opened each time a level responsive device passes it, if the level is approximately up to B—B. Similarly, a second or empty switch 47, so-called because it starts the feed motor when the feed chamber is empty, is normally open, and is closed each time a level indicating device passes it, if the level of material is below the line B—B as, for example, at the level A—A. With this arrangement, the effect would be to condition the circuits to stop the feed motor upon each opening of the full switch and to restore the circuits to continue operation of the feed motor upon closing of the empty switch. Should the level of material be near line A—A, opening of the full switch might not occur, but subsequent actuation of the empty switch would not produce any electrical effect because the circuit it controls would already be closed. With the level at line B—B, the full switch would open to condition the circuits to stop the feed motor but the empty switch would not be closed, hence the feed motor would stop. If the level were at line A—A, requiring the feed of material, the full switch would not be opened but the empty switch would be closed to start the feed motor from a condition of idleness.

The normal effect of the arrangement just described would be, at levels approximating line B—B, to open the full switch and close the empty switch each time that a level indicating device passed the two switches in succession, hence the full switch would stop the feed motor and the empty switch would restart it. The present invention provides means for accomplishing this automatic control without these unnecessary starting and stopping operations. This is achieved by a timing device which controls directly the circuit of the feed motor.

Actuation of the full switch conditions the circuits to start the timing device which after a predetermined interval opens the feed motor circuit. Closing of the empty switch immediately following the opening of the full switch cancels the effect of the full switch restoring the circuits to their original condition and stopping the timing device before it opens the feed motor circuit. In this way, the feed motor circuit continues to run when needed and stops only when the drum or feed chamber is filled to a predetermined level. Consequently, when the feed motor stops, the kiln continues to operate and to lower the level of material in the feed chamber. At the level A—A, actuator 48 is moved to a position where it closes switch 47 to re-start the feed motor. With the arrangement set forth in Fig. 3, therefore, a level of material on line A—A closes switch 47 to start the feed motor which runs until level B—B is reached. At intermediate levels between A—A and B—B both switches are operated but the motor continues to run. When material reaches level B—B, switch 44 stops the feed motor through the timing contact, and switch 47 is not actuated and hence remains closed.

The feed motor control switches are shown diagrammatically in Fig. 2, and in detail in Fig. 3. In Fig. 3, the full switch 44 is shown. It is adapted to remain closed under the action of gravity and to be opened by an actuator 45 controlled by a level sensing device or paddle 46 in the feed chamber of the kiln where it rests on the surface of the material to be fed. Similarly, the empty switch 47 is biased to open position by gravity and arranged to be closed by actuator 48, also under control of the level sensing device 46. The two actuators 45 and 48 are mounted in fixed angular relation to each other and to a shaft 49 which carries an adjustable counterbalancing weight 51. The level sensing device or paddle 46 is fixed to the shaft 49, and the weight 51 biases it against the shell after it passes the switch 47. This prevents fouling of the paddle by material in the chamber getting between the paddle and the shell. Obviously, the precision of the control is dependent upon the number of level sensing devices employed, and increases as their number is increased. The illustration has been simplified by showing only one of these devices on the shell 25.

Due to the centrifugal effects of high linear speeds on the level sensing devices and to adjustment of the feed conservatively exceeding the output, the normal sequence of switch operation is the momentary opening of the full switch and the momentary closing of the empty switch once during each rotation of the kiln for each level sensing device installed around the periphery of the shell 25. This sequence continues until the material reaches level A—A where switch 47 assumes full control, or level B—B where switch 44 assumes full control.

Switch 44 includes a fixed contact 52 resiliently mounted on any suitable fixed support 53, this contact being biased to full line position by a spring 54. Movable contact 55 is biased to full line position by a spring 56, and is adapted to be actuated by a switch plate 57 pivoted at 58 on a support 59. A stop 61 limits the upward movement of plate 57. As the kiln rotates from left to right, the actuator 45 may engage the switch plate 57 to disengage contacts 52 and 55. When the paddle occupies a position corresponding to a level of material A—A, the feeding motor should operate. The actuator 45 will therefore engage the plate 57 and open the switch 44. However, continued rotation of the kiln will cause the actuator 48 to engage the actuating plate of empty switch 47 and to close it, thus restoring the circuits. If the chamber is full the switch 47 will not be operated.

The empty switch 47 is of a construction similar to that of the full switch 44 and differs from the full switch only in having the parts so related that the switch is normally held open instead of closed. It should be pointed out in connection with the switches 44 and 47 that the parts of the kiln are subject to extreme temperature variations which may cause extensive contraction and expansion. There is also much vibration. The provision of the biasing springs 54 and 56 and the longer range of movement of plate 57 assure operation of these switches in spite of the temperature and position extremes and the vibration to which they are subjected. Each switch has its normal position adjustable by means such as a set screw 62 carried by the curved extension of the striker plate 57, and arranged to abut a prolongation of the supporting post 59 which carries the movable contact.

The operating circuits of the control system are fully shown in Fig. 5. The simplified diagram of Fig. 4 illustrates operation of those circuits. In Fig. 5, it will be seen that the feeding motor 36 is arranged to be supplied with operating current from a three-phase line, the line wires of which are designated $L_1$, $L_2$ and $L_3$, respectively. The main control switch 71 has an operating coil S in series with a thermal protective relay arranged to open the motor circuit when a dangerous operating temperature is reached.

The system also includes a relay R having two sets of front contacts $R_1$ and $R_2$, the contacts $R_1$ controlling a by-pass circuit for a contact under control of a timing motor, and the contacts $R_2$ controlling the circuit which includes the full switch 44. A timing relay T is arranged to control the circuit of the timing motor which is ineffective for timing operations except in response to deenergization of the timing relay. The timing motor 87 controls a contact 82 included in the circuit of the feed motor. When the timing motor runs for a predetermined interval it opens its normally closed contact 82. Deenergization of the circuit controlled by contact 82 stops the feed motor. Restarting then is carried out either by push button or automatic means causing relay R to reset contact 82. Contact 82 when opened by the motor 87 remains open until relay T is again energized to close it.

The operating circuits may be traced on the circuit diagram of Fig. 5, and the simplified diagram of Fig. 4. In describing the operating circuits emphasis will be placed upon the two level responsive switches 44 and 47, since the operation of the complete system is under the control of these switches. Full switch 44 is provided to condition the circuits for stopping the feed motor, provided the feed motor circuit is not restored by closing of normally open empty switch 47 during the timing interval of the timing motor 87. In other words, switch 44 conditions the feed motor circuit for stopping unless such conditioning is counteracted by the subsequent operation of switch 47 before the timing motor 87 opens the feed motor circuit through contact 82.

The conditioning of the timing motor for a timing operation is controlled by the timing relay T, in circuit with the switches 44 and 47. The switch 44, for example, controls a circuit from line wire $L_1$, over wire 72, stop button 73, wires 74 and 75, full switch 44, wire 76, contact $R_2$ of relay R, wires 77 and 78, winding of relay T, and wire 79 to line wire $L_3$. This circuit when completed holds the timing relay contact 83 open and timing motor 87 deenergized. The circuit is dependent upon energization of relay R which controls contact $R_2$, and may be broken at any time by stop button 73 to stop the feed motor. The holding circuit for switch operating coil S is from line wire L₁, wire 72, stop button 73, wires 74, 80 and 81, contact R₁ of relay R, wire 95, thermal relay 86, winding S of switch 71, to line wire L₃. When this holding circuit is energized the contact 85 controlled by operating coil S is closed and completes a circuit which includes the timing contact 82 of timing motor 87. Consequently, opening of contact 82 deenergizes operating coil S to open switch 71 and stop the feed motor. This complete circuit is from line wire L₁ over wire 72, stop button 73, line wires 74 and 80, timing contact 82, wire 84, contact 85 of coil S, thermal relay 86, coil S, to line wire L₃.

As will be apparent from the simplified diagram of Fig. 4, switch 44 exerts direct control of timing relay T, which on back contact completes a circuit for the timing motor 87. So long as timing contact 82 remains closed the circuits may be conditioned to continue the operation of the feed motor by closing empty switch 47, subsequent to opening of the full switch 44. Alternatively, the same result can be obtained by manipulation of start button 89. The circuit for empty switch 47 is from line wire L₁ over wire 72, stop button 73, wires 74 and 75, empty switch 47, wire 78, timing coil T, wire 79, to line wire L₃. Completion of this circuit by closing of the empty switch 47 energizes timing relay coil T, opening contact 83 to stop the timing motor 87. The timing motor circuit is from line wire L₁, wire 72, stop button 73, wires 74 and 80, contact 83 of timing relay T, timing motor 87, and wires 91 and 79, to line wire L₃. Consequently, the timing motor circuit is controlled by relay T in response to the operation of both the full and empty switches 44 and 47, respectively. Hence, opening of the full switch 44 closes contact 83 to start the timing motor, and subsequent closing of the empty switch 47 energizes the timing relay coil T to open switch 83 and stop the timing motor.

It is therefore apparent that switches 44 and 47 serve to start and stop a timing operation and thus to control the operation of the feed motor 36 through timing contact 82 of timing motor 87. The timing interval of this motor may be varied to suit conditions. As shown, and with a timing interval of three seconds assumed, the feed motor may be restarted at any time by operation of start button 89 or by closing switch 47. Similarly, feed motor 36 may be stopped by operation of stop button 73. It may also be stopped by opening of switch 44, providing switch 47 is not subsequently closed within the timing interval.

The system described is fully automatic in operation but provision is made for purely manual operation for test purposes or in case it is necessary to replace or repair any of the automatic operating circuits. In order to provide for direct manual control, a manual or emergency switch 93 is arranged in a circuit which by-passes the automatic apparatus and includes only the switch operating coil S and the thermal relay 86. This circuit is from line wire L₁ over wires 72 and 92, switch 93, wires 94 and 95, thermal relay 86, operating coil S, wire 79, and thence to line wire L₃. It merely controls directly the starting and stopping of said motor 36 while including the safety feature of the thermal relay 86. In both Figs. 4 and 5, the operating circuits are shown with the parts in the positions which they would occupy with all of the circuits deenergized preparatory to starting up the feed motor in response either to closing of empty switch 47, operation of start button 89, or manual operation through emergency switch 93.

It will be appreciated that the particular arrangement disclosed is only representative and that changes may be made in the details within the scope of the invention. For example, the timing relay may have various adjustments depending upon conditions to be met. Similarly the full and empty switches 44 and 47 may have their timing periods of operation suited to the size of the kiln or other feeding drum, or the character of material under treatment.

What is claimed is:

1. In combination, a rotary kiln having a feed chamber disposed at the inlet end of the kiln and rotatable with it, said chamber being adapted, when filled to a predetermined level with material to be treated, to preheat that material by heat exchange with the hot gases flowing from the firing zone of the kiln, and arranged to discharge preheated material into the kiln; a source of material to be fired; a storage reservoir for said material, said reservoir being disposed adjacent the inlet end of the kiln; means carried by the kiln for causing periodic delivery of charges of material from said reservoir into said feed chamber during the rotation of the kiln; and automatic means controlled by the level of material in the feed chamber for controlling the delivery of material from said source to said reservoir to keep said reservoir filled when the material in said feed chamber is below a predetermined level.

2. In combination, a rotary kiln having a feed chamber disposed at the inlet end of the kiln and rotatable with it to place incoming material in heat exchanging relation with the hot gases flowing from the firing zone of the kiln, and arranged to deliver the resulting preheated material into the kiln; a storage reservoir for material to be fired in the kiln; an electric motor; means operated by said motor for delivering material to said reservoir; kiln actuated means for delivering charges of material from said reservoir to said chamber; a normally closed switch and a normally open switch in circuit with said motor; means in said chamber for actuating said switches in sequence under predetermined conditions during rotation of said kiln and chamber; and timing means for controlling said motor in accordance with the conditions set up by the operation of said switches to keep said chamber filled to a predetermined level.

3. In combination, a rotary kiln having a feed chamber arranged to rotate with the kiln and deliver material into the inlet end of the kiln; a reservoir for material to be fired in said kiln; means for periodically causing discharge of material from said reservoir into said feed chamber; electric motor operated means for delivering material to said reservoir; a first switch arranged to be operated during each rotation of the kiln to establish conditions to break the motor circuit when the chamber is filled above a predetermined level; a second switch arranged to be actuated during each rotation of the kiln to establish conditions to keep the motor energized only when the material in said chamber is below a predetermined level; and electric timing means for breaking the motor circuit a predetermined time after actuation of the first switch if said second switch is not actuated.

4. In combination, a rotary drum in which material is to be kept at a predetermined level; a storage reservoir for material; electric motor actuated means for feeding material to said reservoir for subsequent delivery to said drum; a first switch responsive to level of material above a predetermined value in said drum for setting up a circuit to stop said motor actuated means; and a second switch responsive to level of material below said predetermined value for restoring said circuits to cause uninterrupted operation of said motor actuated means.

5. In combination, a rotary drum in which material is to be kept at a predetermined level; a storage reservoir for material; means for feeding material to said reservoir for subsequent delivery to said drum; means for transferring material from said reservoir to said drum; an electric motor for operating said feeding means; a timing motor for controlling the circuit of said electric motor; a first switch controlled by the level of material in said drum for starting said timing motor to open the circuit of said electric motor after a predetermined time period; and a second switch controlled by the level of material in the drum for stopping said timing motor during said time period and before the circuit of said electric motor is opened.

6. In combination, a rotary drum in which material is to be kept at a predetermined level; a storage reservoir for material; means for feeding material to said reservoir for subsequent delivery to said drum; means for transferring material from said reservoir to said drum; an electric motor for operating said feeding means; a timing motor for controlling the circuit of said electric motor; a first switch for starting said timing motor when the level of material in said drum exceeds a predetermined value; and a second switch arranged to be actuated by the material in the chamber when it is below said predetermined value to open the circuit of the timing motor.

7. In combination, a rotary kiln having a feed chamber disposed at the inlet end of the kiln and rotatable with it and arranged to deliver material into the kiln; a storage reservoir for material to be fired in the kiln; an electric feed motor; means operated by said motor for delivering material to said reservoir for subsequent delivery to said chamber; kiln actuated means for delivering material from said reservoir to said drum; a normally closed switch and a normally open switch in circuit with said motor; means in said chamber for actuating said switches in sequence under predetermined conditions during rotation of said kiln and chamber; a timing motor for controlling the circuit of said feed motor; and relay operated means under the control of said switches for controlling said timing motor.

8. In combination, a rotary kiln having a feed chamber arranged to rotate with the kiln and deliver material into the inlet end of the kiln; a reservoir for material to be fired in said kiln; means for periodically causing discharge of material from said reservoir into said feed chamber; electric motor operated means for delivering material to said reservoir; a first switch arranged to be operated during each rotation of the kiln to establish conditions to break the motor circuit when the chamber is filled above a predetermined level; a second switch arranged to be actuated during each rotation of the kiln to establish conditions to keep the motor energized only when the material in said chamber is below a predetermined level; electric timing means for breaking the motor circuit a predetermined time after actuation of the first switch if said second switch is not actuated; and relay operated means in circuit with said switches for controlling said timing means.

9. In combination, a rotary drum having a diameter subject to extreme variations; an electric motor; means actuated by said motor for feeding material for subsequent delivery into said drum; means permitting the discharge of material from said drum; a switch in circuit with said motor and mounted adjacent said drum and having a fixed contact and a movable contact; a shock absorbing spring means for each of said contacts and biasing them to predetermined positions while permitting movement of the same under impact; a pivoted member connected to the movable contact and having a wide angle of movement; and means carried by and subject to the variations in diameter of said drum and movable in response to variations in the level of material in said drum, for actuating said pivoted member.

10. In combination, a rotary drum subject to extreme changes in diameter; a reservoir; an electric motor; means actuated by said motor for feeding material into said reservoir for delivery into said drum; means for periodically performing such delivery; a switch in circuit with said motor and mounted adjacent said drum; a fixed contact on said switch; spring mounting means for said fixed contact; a movable contact; spring mounting means for said movable contact; a pivoted member connected to said movable contact and having a wide angle of movement; and a switch actuator carried by said drum to expand and contract with it, and responsive to the material level in said drum for actuating said pivoted member to operate said switch.

HAROLD R. BRESLAU.